(12) United States Patent
Raffaelli et al.

(10) Patent No.: US 8,068,878 B2
(45) Date of Patent: Nov. 29, 2011

(54) SYSTEM. METHOD, AND BASE STATION ANTENNA FOR CELLULAR RADIO COVERAGE

(75) Inventors: Silvia Raffaelli, Cambridge (SE); Martin Johansson, Molndal (SE); Sven Petersson, Savedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1187 days.

(21) Appl. No.: 11/813,127

(22) PCT Filed: Dec. 30, 2004

(86) PCT No.: PCT/SE2004/002041
§ 371 (c)(1),
(2), (4) Date: Jun. 29, 2007

(87) PCT Pub. No.: WO2006/071154
PCT Pub. Date: Jul. 6, 2006

(65) Prior Publication Data
US 2008/0167077 A1    Jul. 10, 2008

(51) Int. Cl.
*G06F 15/16* (2006.01)
(52) U.S. Cl. ..................... 455/562.1; 455/524

(58) Field of Classification Search .................. 455/453, 455/524, 562.1; 370/335
See application file for complete search history.

(56) References Cited

U.S. PATENT DOCUMENTS

| 5,973,641 A | 10/1999 | Smith et al. |
| 6,122,266 A | 9/2000 | Lynch |
| 6,236,866 B1 * | 5/2001 | Meyer et al. ............... 455/562.1 |
| 2007/0021151 A1 * | 1/2007 | Mori et al. .................. 455/562.1 |

FOREIGN PATENT DOCUMENTS

| JP | H10-093338 A | 4/1998 |
| JP | H11-127105 A | 5/1999 |
| JP | 2001-197551 A | 7/2001 |

* cited by examiner

*Primary Examiner* — Sam Bhattacharya (57) ABSTRACT

A system, method, and base station antenna for improved coverage in a cellular mobile telephony network. Each cell in the network has an area defined by azimuth and range limits. In the system, a first cell and a second cell are essentially adjacent to each other in azimuth. A third cell has an azimuth limit that is essentially equal to the total azimuths of the first and second cells, and has a range coverage that is shorter than the ranges of the first or second cells. The base station antenna forms separate "conventional" beams for the first and second cells, and forms a "near cell" beam for the third cell.

12 Claims, 8 Drawing Sheets

SYSTEM, METHOD, AND BASE STATION ANTENNA FOR CELLULAR RADIO COVERAGE

TECHNICAL FIELD

The present invention discloses a system for cellular mobile telephony. The system comprises a base station antenna and a plurality of cells, where each cell has a specific area coverage which is defined by an azimuth coverage and a range coverage.

A first and a second cell in the system cover first and second areas respectively, the areas being defined by a first and second azimuth and a first and second range respectively.

The first and the second cell are essentially adjacent to each other in azimuth, and the system also comprises a third cell with a third area coverage which is defined by a third azimuth coverage and a third range coverage.

BACKGROUND ART

In cellular telephony systems, the area covered by the system is, as the name implies, divided into cells. Usually, the cells are divided along a more or less radial direction, extending from a centre point where a base station and an antenna associated with the base station is located.

A user in the system will adaptively be assigned to one or a few of the cells of the system, usually the cell or cells for which the user's telephone experiences the best signal quality, typically defined by the signal strength or signal-to-interference-plus-noise ratio, S/(I+N), of a broadcast reference signal, for example a pilot signal in a CDMA system. The adaptivity means that the user is "handed over" from one cell to another depending on the signal quality of the broadcast reference signals corresponding to the respective cells.

The cells are thus defined by the coverage of the base station antenna or antennas in terms of a quality measure such a signal strength or S/(I+N). Near the site of the base station, where the borders of the cells converge, there will be a plurality of borders close to each other, which may lead to very frequent and rapid handovers, which is not desirable, as this may lead to reductions in communication quality, and in some cases even to dropped telephone calls.

DISCLOSURE OF THE INVENTION

There is thus a need for a cellular telephony system in which the amount of "handovers" close to the base station could be reduced.

This need is addressed by the present invention in that it discloses a system for cellular mobile telephony which comprises a base station antenna and a plurality of cells, where each cell has a specific area coverage defined by an azimuth interval coverage and a range coverage.

A first and a second cell cover first and second areas respectively, the areas being defined by a first and second azimuth interval and a first and second range respectively.

The first and second cells are essentially adjacent to each other in azimuth, and the system also comprises a third cell with a third area coverage defined by a third azimuth interval coverage and a third range coverage.

According to the invention, the third azimuth coverage interval is essentially the same as, and coincides with, the total azimuth coverage intervals of the first and the second cell. However, the third cell has a range coverage which is significantly smaller than the first or second range coverages, as a result of which, within the third area, essentially all traffic will be assigned to the third cell.

In practice, this means that in a system of the invention, all users in an area close to the base station are assigned to the third cell, irrespective of which azimuth direction they are in. This will naturally reduce the amount of handovers close to the base station, and farther out from the base station, the problem of frequent and rapid changes in signal quality due to many cell borders being located close together will be solved by the inherent geometry of the system, thus providing sufficient time for handover.

Suitably but not necessarily, the range coverage of the first and second cells are essentially identical.

The total azimuth coverage of the system, i.e., in this case defined above with the first and second cells in the system, can be 360 degrees. In such a system however, a larger number of cells could also be used.

The invention also covers an antenna to be used with the system.

BRIEF DESCRIPTION OF THE DRAWINGS

The invention will be described in more detail with reference to the appended drawings, in which FIG. 3 shows a system in which a principle of the invention is employed, and.

EMBODIMENTS OF THE INVENTION

Figure 1:
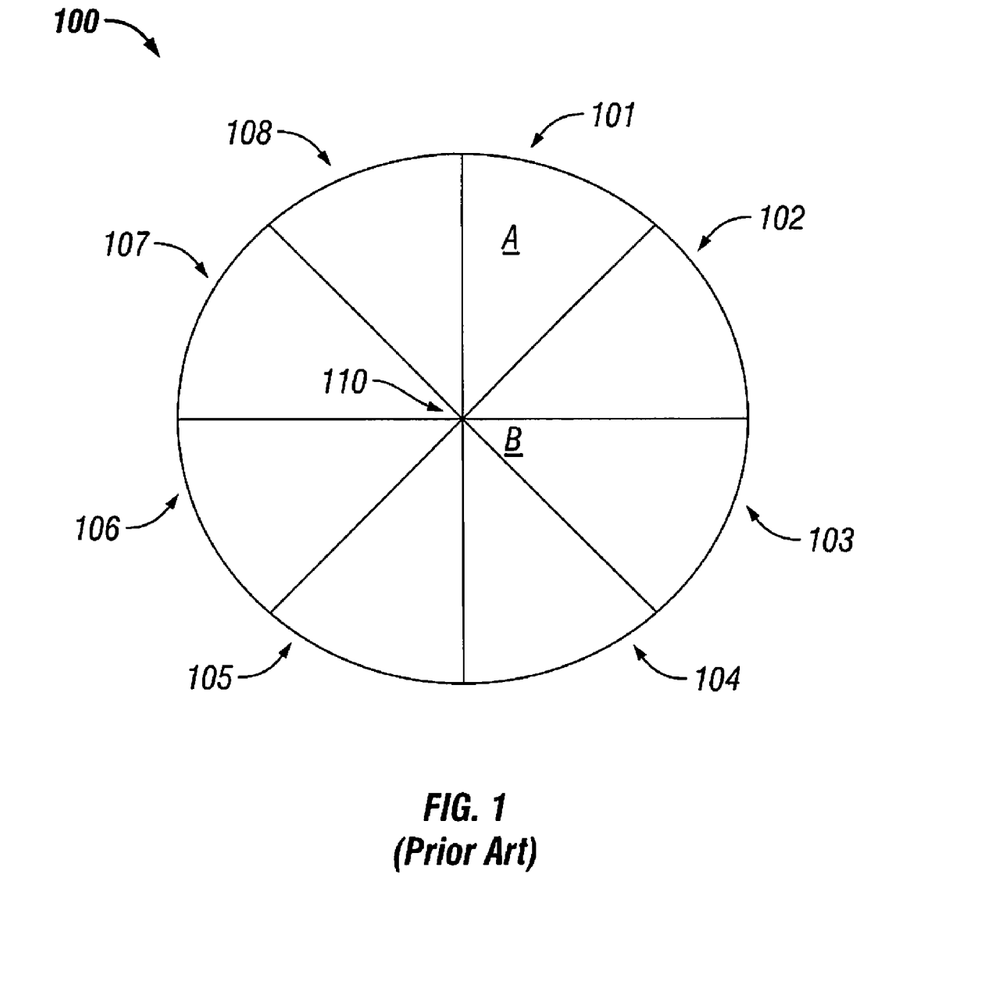
FIG. 1 shows a schematic top view of a conventional cellular telephony system.

FIG. 1 shows a conventional system 100 for cellular telephony. The system 100 will throughout be described as a CDMA or a WCDMA-system, but it will be appreciated that the principle of the invention can also be applied to cellular telephony systems which employ other principles, such as for example the TDMA-principle.

The system 100 is seen in FIG. 1 in a top view, and is shown in an idealized manner. Thus, the system comprises a bases station 110, at centre of the system, and the system is shown as comprising a number of cells, in this case eight cells 101-108.

In FIG. 1, the system is shown as a wheel divided by spokes, where the spokes are the borders between the cells. This is an idealized case, but will serve well to illustrate a basic principle of the invention.

A user of the system will be assigned to the cell for which the user's telephone terminal has the best communication with the base station 110. The communications quality is constantly measured, and if certain criteria are met, the user is "handed over" to another cell with which the user's telephone terminal has better communication quality.

Looking at user A in FIG. 1, for example, the cell which user A is assigned to will be cell 101, since user A is located in the centre of that cell and is quite far from the adjoining cells.

However, it will be realized that for user B the situation is quite different: user B is relatively close to the base station 110, and can thus be subjected to rather frequent handovers, since the cell for which user B has the best communications quality will change quite often, especially if user B moves in a direction which is perpendicular to the cell borders.

Thus, users who are close to the base station 110 will cause requirements for quite rapid and frequent handovers. In a less idealized situation than the one shown in FIG. 1, the situation can be even worse, since the borders of more than two cells can more or less converge in one and the same point.

These requirements for rapid and frequent handovers may lead to poor communications quality, and, in some cases, even to dropped telephone calls.

Figure 2:
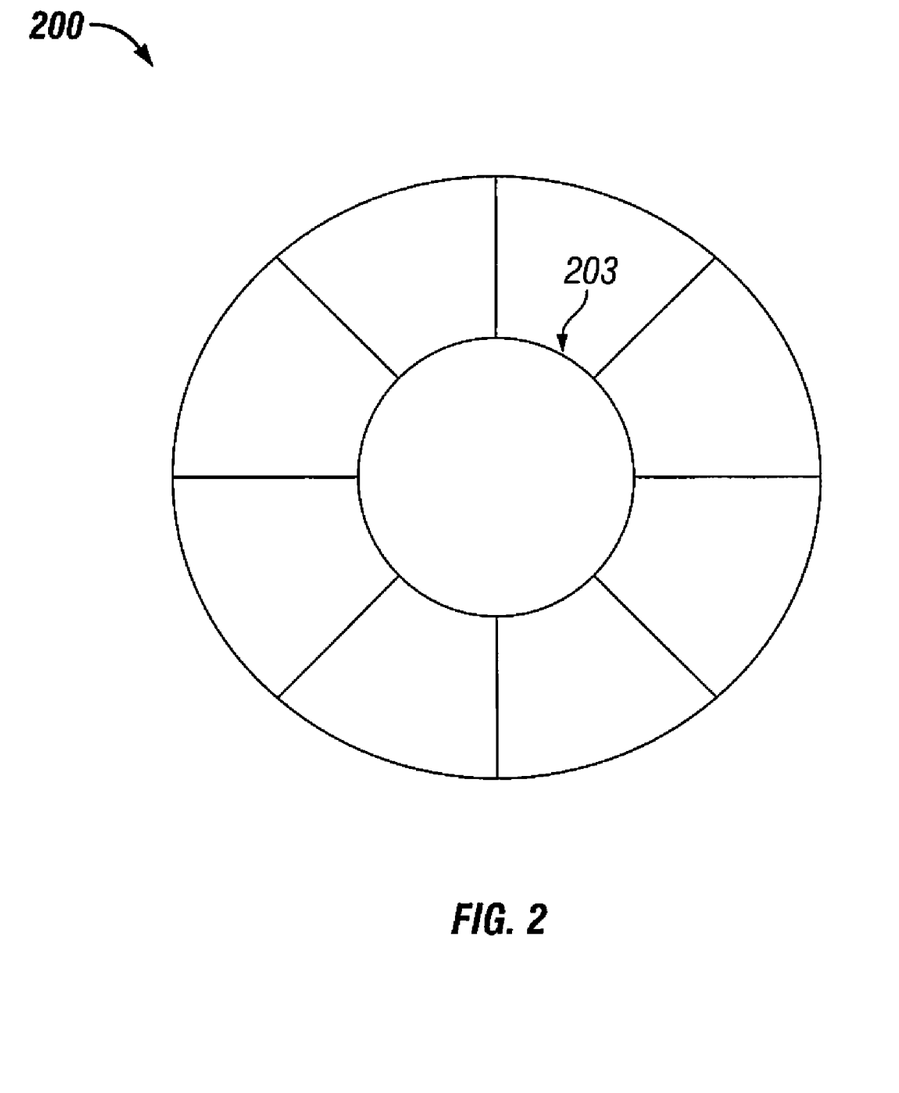
FIG. 2 shows a schematic top view of a cellular telephony system according to one embodiment of the invention.

FIG. 2 shows a system 200 according to the invention, seen from the same point of view as the conventional system 100 shown in FIG. 1. Again, it should be stressed that FIG. 2 shows an idealized system, but the drawing will serve to facilitate the understanding of the invention.

As shown in FIG. 2, the system 200 of the invention comprises all of the cells of the system 100 of FIG. 1, but it also comprises an additional cell 203 with characteristics that are slightly different from the other cells 101-108.

The system of the invention will work well with the configuration shown in FIG. 2, but other system configurations will also work well. Accordingly, the invention will be explained in more detail with reference to FIG. 3, which shows a system 300 in which one of the principles of the invention is employed.

Figure 3:
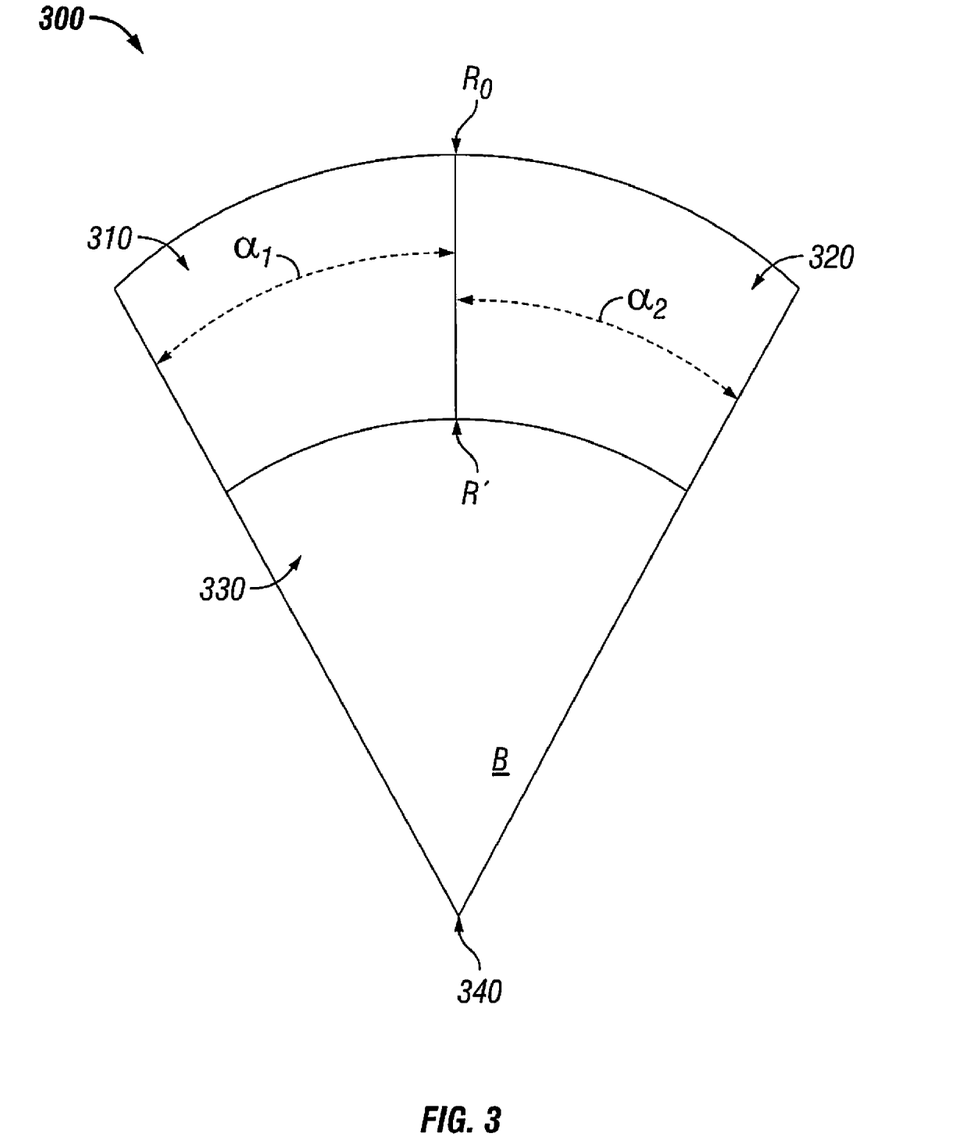

The system 300 shown in FIG. 3 comprises a base station antenna 340 and a plurality of cells, in this case two cells 310, 320. Each of the two cells have a specific area coverage which is defined by an azimuth interval coverage $\alpha_1$, $\alpha_2$, and a range coverage $R_0$ which may be the same or different for the two cells.

The two cells 310, 320, are essentially adjacent to each other in azimuth, i.e. their borders only overlap by a predetermined amount, if at all. The system 300 also comprises a third cell 330 with a third area coverage which is defined by a third azimuth interval coverage and a third range coverage.

According to the invention, the third azimuth interval coverage is essentially the same as, and coincides with, the total azimuth interval coverage $\alpha_1+\alpha_2$ of the first and the second cell. In other words, the azimuth angle interval covered by the third cell 330 is essentially the same as the sum of the azimuth interval angles of the two other cells 310, 320.

However, the third cell 330 has a maximum range coverage R' which is significantly smaller than the first or second range coverage. Within the area covered by the third cell, all traffic is handled by the third cell, so that the user B, shown again in FIG. 3, may move within an area close to the base station antenna 340 and still remain within one and the same cell 330 which will reduce the amount of handovers required at distances close to the base station antenna 340.

As will be shown in more detail later in this description, within the area covered by the third cell 330, the third cell 330 will dominate with respect to communications quality, e.g. the received signal strength or S/(I+N) at a user's terminal.

In other words, by means of the invention, a "near cell" is added to the system in order to handle the traffic within a certain distance from the base station antenna 340. Outside of the range R' covered by the "near cell" 330, calls will be handled in the way known from the conventional system 100 shown in FIG. 1.

Suitably, but not necessarily, the range coverage of the first 310 and second cell 320 are essentially identical, as shown in FIG. 3. Also, in order to make it easy to plan for the system 300, each of the areas covered by the first, second and third cells may be of essentially the same size.

In the system 300 shown in FIG. 3, the first and second cells have equal azimuth coverages, and together cover only a part of the area around the base station antenna. However, the amount of cells and the coverage can of course be varied, and it would also be conceivable to let the first and second cells together have an azimuth coverage of 360 degrees.

As for the range coverage R' of the third cell 330, this may of course be designed so as to be any suitable percentage of $R_0$, but the third range coverage $R_0$ would in many applications be at the most half of the smaller of the first and second range coverages.

As mentioned, one of the desired effects of adding the third cell, the "near cell" 330, is for that cell to dominate with respect to communications quality at distances out to the range R'. This means that the quality of signals corresponding to the third cell 330 must be higher than that of cells with which it co-habits, i.e., in the case shown in FIG. 3 either the first 310 or the second cell 320, in the conventional manner of a cellular communications system. Similarly, at distances beyond R', the opposite must be true, in other words the first or the second cell must dominate at those distances.

Figure 4:
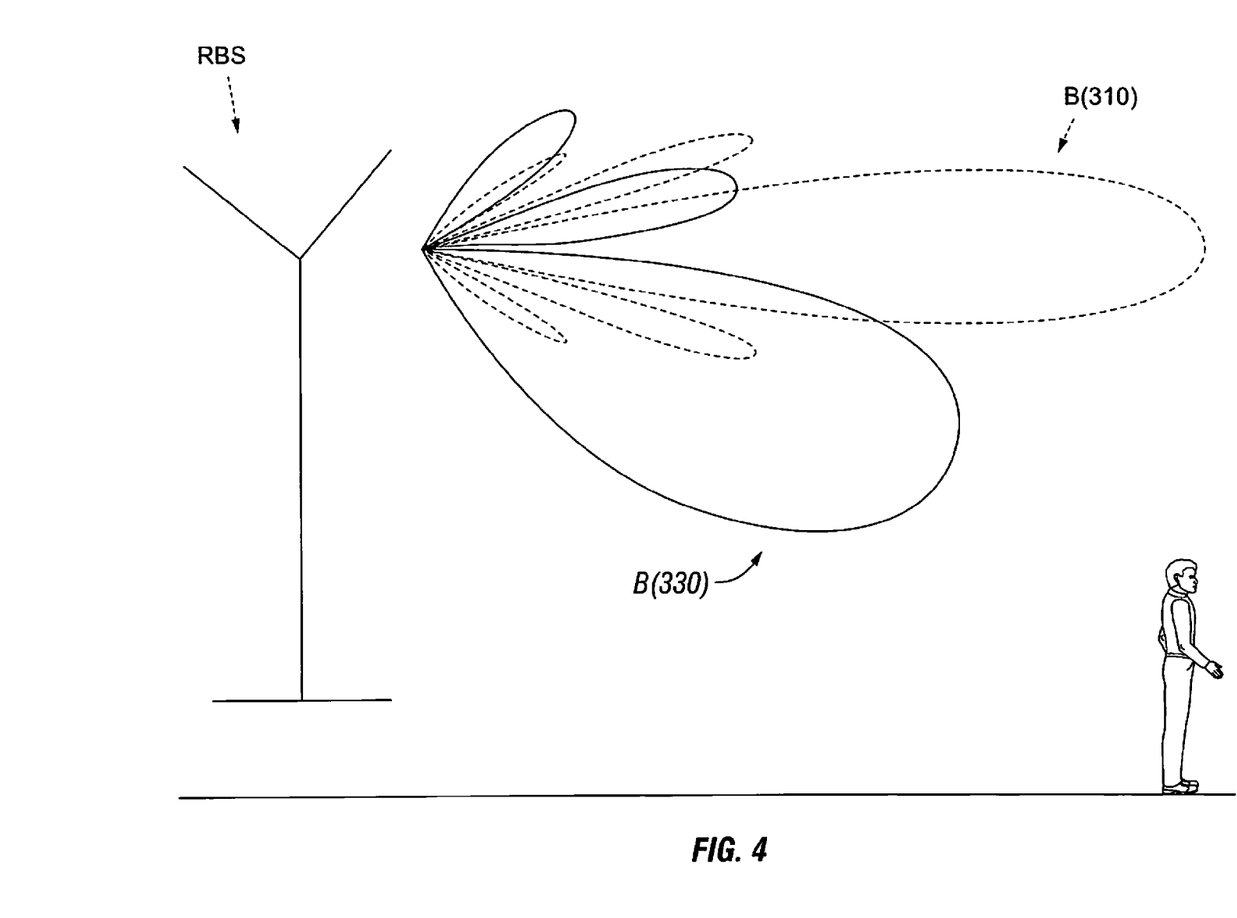
FIG. 4 shows a radiation diagram of an antenna for use in the invention.

FIG. 4 shows a side view (as opposed to FIG. 3, which is a top view) of the main beam pattern representing the effective power density of an example of a radiation pattern which could be suitable in order to achieve the desired result.

In this case, the view is one of an imagined cross section through cells 330 and 310, but a similar pattern would be seen in a cross section through cells 320 and 330: A first beam B(310) is intended to cover the first cell 310, and a second beam, B(330), is intended to cover the third cell 330. The radiation pattern B(310) of the first cell 310 is shown with dashed lines, and the radiation pattern B(330) of the "near cell" 330 is shown with solid lines.

Also indicated in the drawing is a Radio Base Station (RBS) with the antenna(s) in question, as well as ground level, indicated by a symbolic person.

As can be seen, the first beam B(310) will provide a higher effective power density for a specific elevation angle range corresponding to a particular range, which in this case will be the distance R' that is defined as the range coverage of the "near cell" 330. Within that distance, the beam B(330) of the "near cell" 330 will be the stronger, which will lead to the desired effect: telephone terminals at a distance closer than R' to the base station antenna will have their traffic handled by the "near cell" 330, and telephone terminals beyond that distance will have their traffic handled by the first cell 310.

The beams are illustrated in such a way as to represent the absolute or relative effective power density of radiated signals, e.g. the product between radiated power and antenna gain. Thus, a greater beam pattern radius represents higher power density.

The radiation pattern B(330) shown in FIG. 4 is one which has a main beam with an upper and a lower elevational angle which delimit the main beam. It should be pointed out that in FIG. 4, not only the main beams are shown, both beams are shown as having a number of side lobes associated with them.

In general, regardless of the kind of antenna used, this is one of the principles of the invention: the "near cell" is equipped with an antenna which out to a predefined distance R' from the base station antenna will be perceived by the terminals as dominant, at least at ground level and close to ground level. Beyond this distance, the beams of the "traditional cells" will be perceived as dominant, and will thus handle the traffic within their respective borders.

Figure 5:
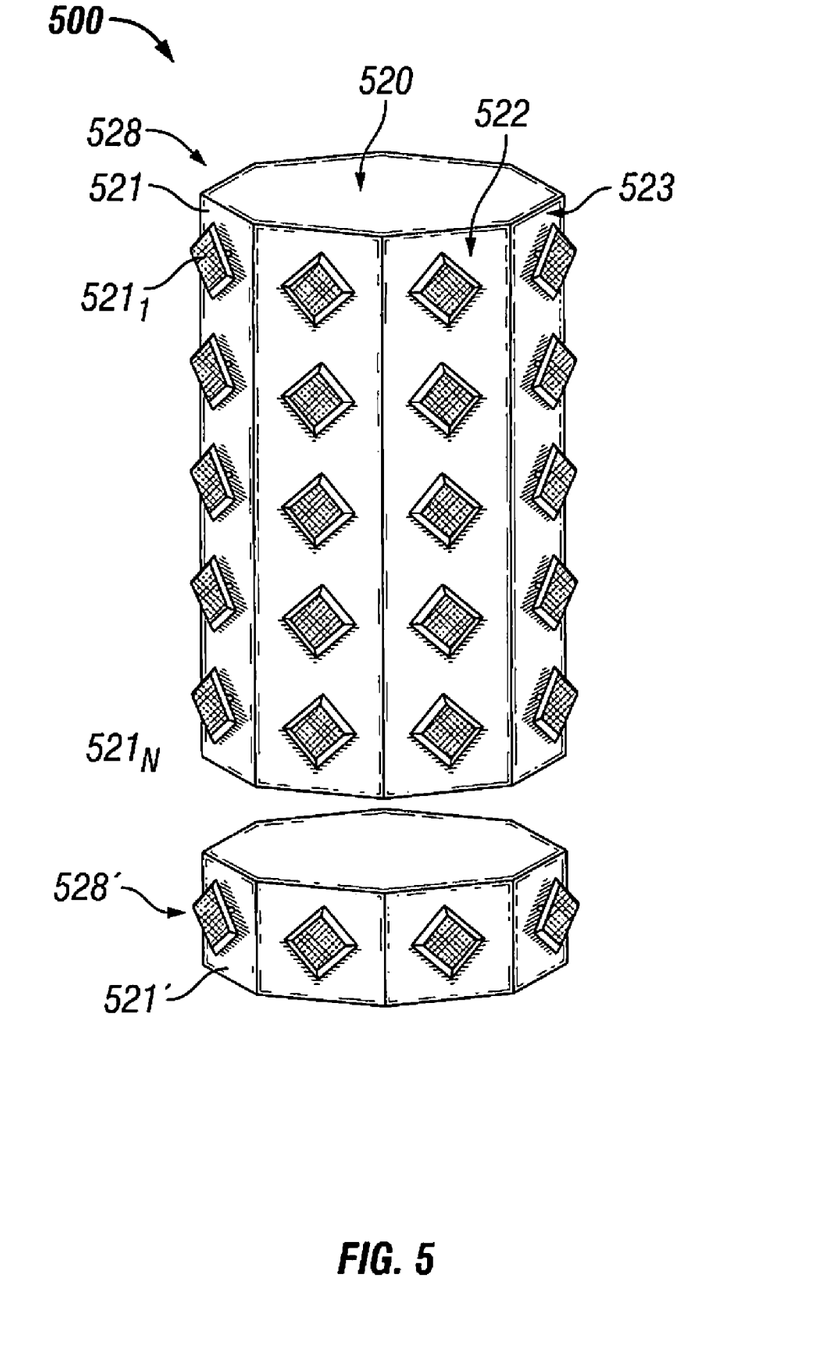
FIG. 5 shows an antenna according to a first embodiment of the invention.
Figure 6:
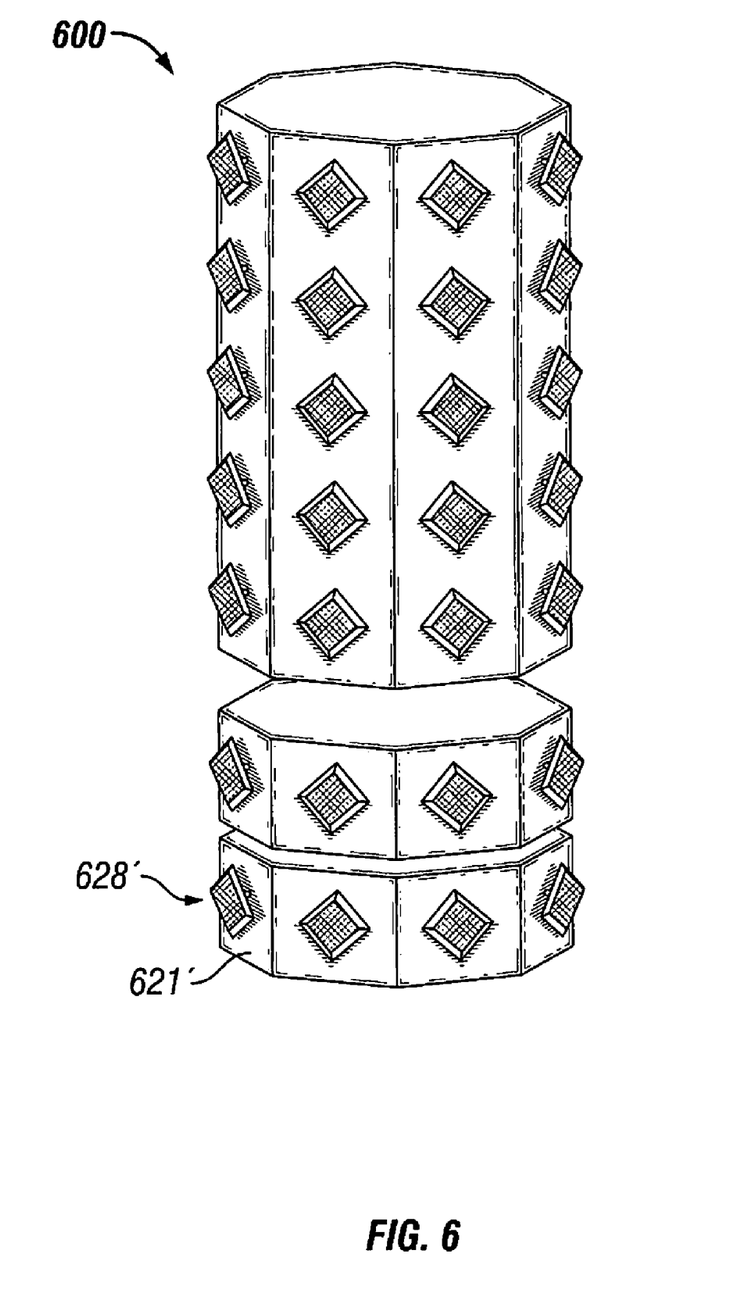
FIG. 6 shows an antenna according to a second embodiment of the invention.

FIG. 5 shows a first embodiment of an antenna 500 which may be used to generate the desired radiation patterns: the antenna 500 is an array antenna, in this case a cylindrical array antenna. In this context, the term cylindrical is used as a generic term for antennas with an essentially fixed cross-sectional shape, intended to also include antennas with a mechanical shape which is not perfectly circular, such as hexagonal, or as shown in FIG. 6, octagonal.

The array antenna 500 is equipped with a number of columns 521-528, preferably but not necessarily arranged equidistantly around the circumference of the octagon 500. Each column comprises a number of radiation elements, $521_1$-$521_N$-$528_1$-$528_N$, arranged longitudinally in the direction of the cylinder axis.

The radiation elements $521_1$-$521_N$-$528_1$-$528_N$, can be used to generate radiation patterns or beams which will cover the first and second areas in the mobile telephony system described above. With the antenna shown in FIG. 5, an azimuth angle of 360 degrees can be covered, within which up to eight cells can be covered.

According to the invention, the antenna 500, apart from the radiation elements of the columns 521-528 also comprises a separate set of columns 521'-528' arranged around the circumference of the cylinder, each of which column comprises at least one radiation element.

This separate set of columns 521'-528' can generate a radiation pattern which will cover the third area in the mobile telephony system. The word "separate" as used here does not necessarily mean that the separate set of columns needs to be mechanically separated from the other columns as shown in FIG. 5, it is also possible to use one or more of the radiation elements in the existing columns for this purpose However, the antenna 500 shown in FIG. 5 comprises an extra set of columns 521'-528', each column having at least one radiation element, with the extra set of columns for example arranged below or above the other set of columns, "below" and "above" here being used in as referring to the direction that the antenna is intended to be used in the cellular telephony system.

The use of the columns 521-528 or radiation elements which is to be used to generate the traditional cells will not be elaborated upon here, since that is a technique which is well known to those skilled in the field.

However, the separate set of columns 521'-528' which is used to generate the omni-coverage of the near cell described above can be achieved in the following manner: all of the elements in the columns 521'-528' could be connected in phase with a corporate feed network. This would generate an omni-directional beam in azimuth, with close to uniform amplitude, and a broad vertical beam. As an alternative or option, in order to improve the "near-zone" coverage, the elements of the extra or separate columns could be mechanically tilted downward.

FIG. 6 shows a second embodiment 600 of an antenna which can be used in the telephony system of the invention. Since the antenna 600 is a version of the antenna 500 of FIG. 5, reference numerals are only shown for those parts which have not been given reference numerals in FIG. 5.

In the antenna 600, at least one of the columns 621'-628' comprises two radiation elements, although more elements in each column can be envisioned.

Another way of describing the antennas of FIG. 5 or 6 is that the conventional antenna has been equipped with an additional ring 521'-528', 621'-628', of radiation elements.

One advantage of the antenna 600 as compared to the antenna 500 is that the use of two radiation elements in one or more of the "extra" columns makes it possible to tilt the beam of the near cell generated by such columns downwards electrically:

By feeding each set of antenna elements in a particular column 621'-628' with a separate vertical phase-matched feed network, the vertical elements can be made to generate a phase-steered down-tilted beam. By again connecting all of the extra columns in phase with a corporate feed network, an omni-directional beam is obtained with close to uniform amplitude in the azimuth direction and a vertical beam with its beam width given by the amplitude and phase-relations of the vertical feed network and element patterns of the antennas in the extra rings.

In addition to the configurations which have been shown in FIG. 5 and FIG. 6, more general antenna configurations can be envisioned in which each of the columns 621'-628' have one or more elements, the number of which is individually defined for each separate column.

Figure 7:
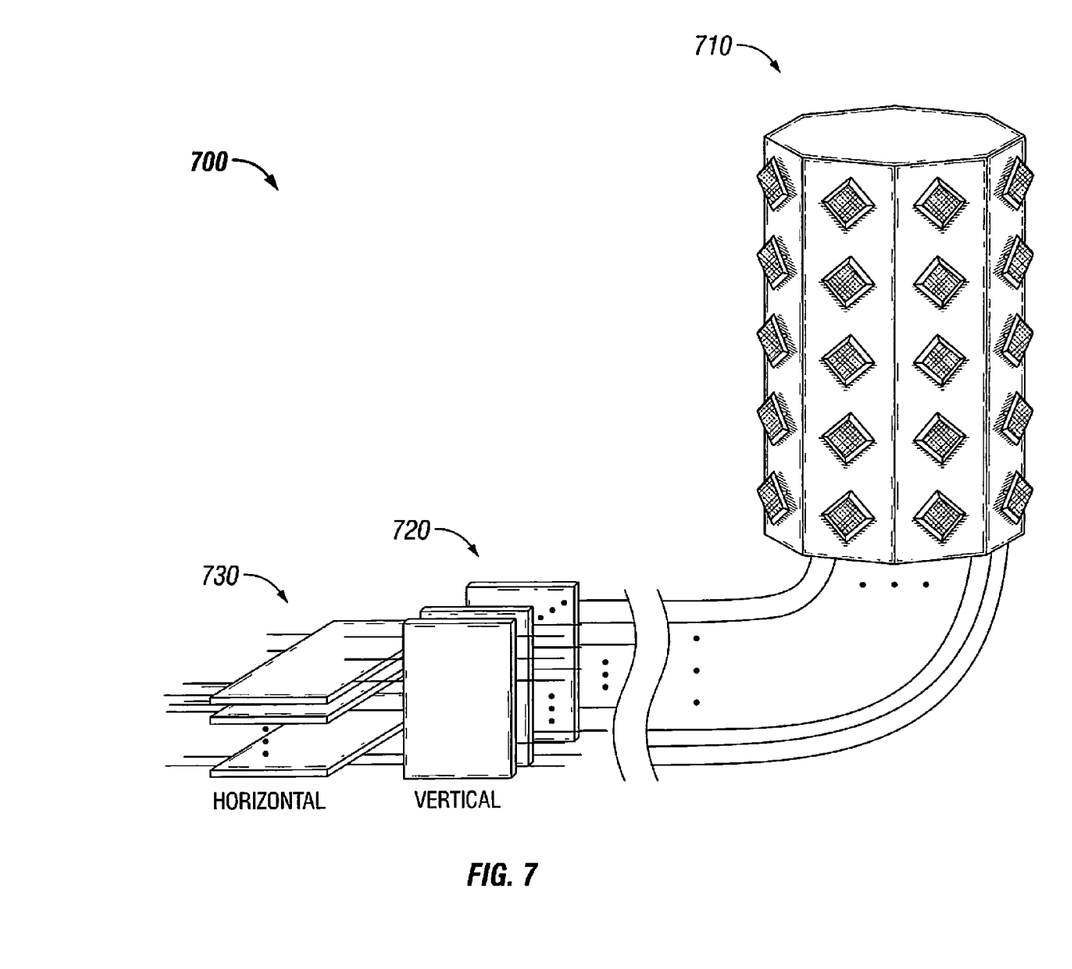
FIG. 7 shows an antenna according to a third embodiment of the invention.

FIG. 7 shows a third embodiment 700 of an antenna which may be used in a cellular telephony system according to the invention:

The antenna 700, in similarity to the antennas shown previously, has a first and a second plurality of radiation elements, both of which in this case however are connected to a two-dimensional beam forming network, by means of which a plurality of beams or radiation diagrams can be generated in both azimuth and elevation. By means of the antenna 700, separate beams may thus be formed for each of the relevant areas or cells, such as, for example, the first, second and third areas in the cellular telephony system shown in the drawings and described above.

Thus, in the antenna 700, as opposed to the antennas 500 and 600, there is no need for "dedicated" radiation elements which are used only for the "near cell" or for the "conventional" cells.

As indicated in FIG. 7, in the antenna 700 is a cylindrical array antenna, in this case an octagon, which, as mentioned, is equipped with beam-forming networks in two dimensions, both elevation and azimuth, so that a plurality of beams may be formed in elevation.

As an example, the antenna 700 may feed each individual column with a separate feeder network, and the signals from the output ports of the vertical feed networks 720 can be combined using two or more beam-forming networks 730 in azimuth.

By including a calibration network to each antenna element, beam forming could be done digitally in both vertical and azimuth direction. Calibration could also be implemented on column-basis only (i.e., between columns, with fixed beam forming networks within the columns), which would allow azimuth beam forming to be done digitally.

Beam-forming networks (for example Butler matrices) can be applied to one or both of two orthogonal polarizations (in the case of dual-polarized antenna elements) and can connect to different numbers of antenna elements in elevation.

Figure 8:
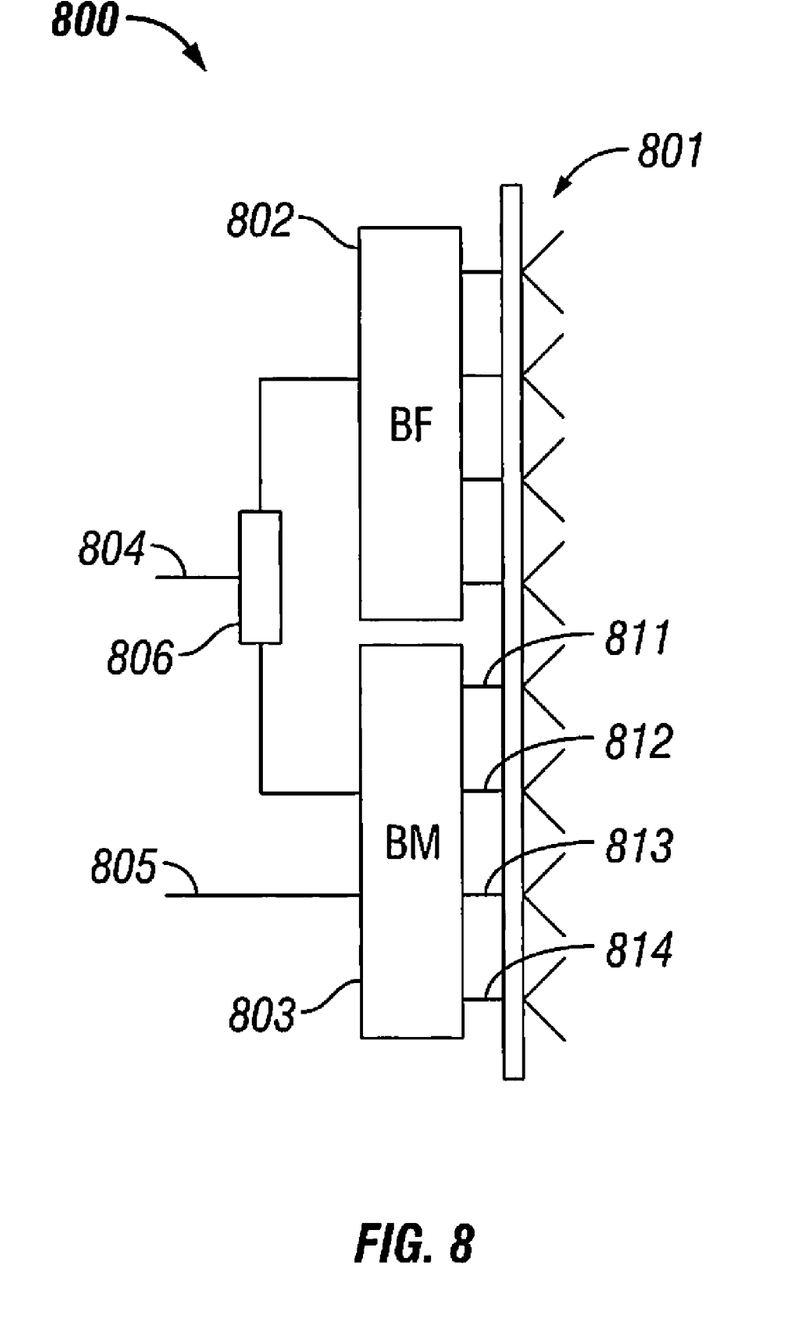
FIG. 8 shows the configuration for a single column in one possible implementation of the embodiment of FIG. 7.

Finally, FIG. 8 shows the configuration for a single column in one possible implementation of the embodiment of FIG. 7.

A column of radiating elements 801 is fed using one corporate beam forming feed network (BF) 802 for the upper half of column 801 and one Butler matrix feed network (BM) 903 for the lower half of column 801.

The input port of the corporate beam forming feed network 802 and the input port corresponding to a desired linear phase front over the output ports of Butler matrix feed network 803 are connected with a power divider 806 to generate a narrow main beam for far coverage when fed from a common beam port 804.

One input port 805 of the Butler matrix feed network 803 corresponding to a linear phase front over the Butler matrix output ports 811-814 is used to produce the near coverage beam. Since the Butler matrix feeds only half of the column of radiating elements 801, the near coverage beam fed from input port 805 of the Butler matrix is wider than the far coverage beam fed using beam port 804.

The invention is not limited to the examples of embodiments shown, but may be freely varied within the scope of the appended claims. Variations which may be envisioned are, for example, a system in which more than one "near cell" are employed to cover a certain azimuth interval. Such multiple "near cells" would thus be basically adjacent in azimuth, and have more or less similar range coverages.

Also, the number of far cells which are complemented by "near cells" need naturally not be limited to the numbers described above and shown in the drawings, but may be varied freely within the limits of the system.

The invention claimed is:

1. A method in a radio base station for providing mobile telephony coverage to a service area, said method comprising the steps of:
    transmitting and receiving radio signals from the base station into a first cell and a second cell, wherein the first cell covers a first azimuth interval and the second cell covers a second azimuth interval adjacent to the first azimuth interval, and the first and second cells cover a first range interval between a minimum range and a maximum range from the base station;
    transmitting and receiving radio signals from the base station into a third cell covering a second range interval having a maximum range essentially equal to the minimum range of the first range interval, said third cell covering a third azimuth interval essentially equal to the total azimuth interval of the first and second cells; and
    providing telephony services through the third cell to all traffic within the third azimuth interval and within the second range interval.

2. A system for cellular mobile telephony, the system comprising:
    a base station antenna for transmitting and receiving radio signals in a plurality of radiation patterns; and
    a plurality of cells formed by the radiation patterns, each cell having a specific area coverage defined by an azimuth interval coverage ($\alpha_1$, $\alpha_2$) and a range coverage between a minimum and a maximum range ($R_0$, R'), wherein:
        a first and a second cell cover first and second areas, respectively, said areas being defined by first and second azimuth intervals and first and second range intervals, respectively, the first and second cells being essentially adjacent to each other in azimuth; and
        a third cell covers a third area defined by a third azimuth interval and a third range interval, wherein the third azimuth interval is essentially the same as, and coinciding with, the total azimuth interval of the first and the second cells, but with the third cell having a range coverage which is significantly smaller than the first or second range intervals; and
    means for handling all traffic within the third area by the third cell.

3. The system as recited in claim 2, wherein the range intervals of the first and second cells are essentially equal.

4. The system of any as recited in claim 2, wherein each of the first, second, and third cell coverage areas are essentially the same size.

5. The system as recited in claim 2, wherein the first and second cells together have an azimuth interval coverage of 360 degrees.

6. The system as recited in claim 2, wherein the maximum range (R') of the third range interval is one-half of the minimum range (Ro) of the first and second range intervals.

7. An array antenna for use in a base station in a mobile telephony system, comprising:
    a first plurality of radiation elements for generating radiation patterns which cover first and second areas, respectively, said areas being defined by first and second azimuth intervals and first and second range intervals, respectively, the first and second cells being essentially adjacent to each other in azimuth;
    a second plurality of radiation elements for generating a radiation pattern which covers a third area defined by a third azimuth interval and a third range interval, wherein the third azimuth interval is essentially the same as, and coinciding with, the total azimuth interval of the first and the second areas, but with the third area having a range coverage which is significantly smaller than the first or second range intervals;
    wherein the array antenna is a cylindrical array antenna in which' said first plurality of radiation elements include a number of antenna elements arranged in a first set of columns around a circumference of the cylindrical antenna; and
    wherein the second plurality of radiation elements is arranged in a second set of columns arranged around the circumference of the cylindrical antenna, each column in the second set including at least one radiation element.

8. The antenna as recited in claim 7, wherein at least one of the columns in the second set includes at least two radiation elements.

9. The antenna as recited in claim 8, wherein each set of antenna elements in each column is arranged to be fed with separate vertical phase-matched feed networks.

10. The antenna as recited in claim 7, wherein the second plurality of radiation elements includes antenna, elements which are mechanically tilted so as to achieve a radiation pattern which decreases their coverage in the first and second areas.

11. The antenna as recited in claim 7, wherein the second plurality of radiation elements is fed via a common feed network.

12. The antenna as recited in claim 7, wherein both the first and the second pluralities of radiation elements are connected to a two-dimensional beam forming network, which forms a plurality of radiation patterns in both azimuth and elevation, so that separate patterns may be formed for each of the first, second, and third areas in the cellular telephony system.

* * * * *

UNITED STATES PATENT AND TRADEMARK OFFICE
CERTIFICATE OF CORRECTION

PATENT NO.         : 8,068,878 B2                                Page 1 of 1
APPLICATION NO.    : 11/813127
DATED              : November 29, 2011
INVENTOR(S)        : Raffaelli et al.

It is certified that error appears in the above-identified patent and that said Letters Patent is hereby corrected as shown below:

On the Title Page, in Field (54), in the Title, in Column 1, Line 1, delete "SYSTEM." and insert -- SYSTEM, --, therefor.

On the Title Page, in Field (75), under "Inventors", in Column 1, Line 2, delete "Molndal (SE);" and insert -- Mölndal (SE); --, therefor.

On the Title Page, in Field (75), under "Inventors", in Column 1, Line 3, delete "Savedalen (SE)" and insert -- Sävedalen (SE); --, therefor.

In Column 1, Line 1, delete "SYSTEM." and insert -- SYSTEM, --, therefor.

In Column 2, Line 29, delete "and." and insert -- and --, therefor.

In Column 6, Line 60, delete "903" and insert -- 803 --, therefor.

In Column 8, Line 5, in Claim 4, delete "of any as" and insert -- as --, therefor.

In Column 8, Line 13, in Claim 6, delete "(Ro)" and insert -- $(R_0)$ --, therefor.

In Column 8, Line 31, in Claim 7, delete "which'" and insert -- which --, therefor.

In Column 8, Line 46, in Claim 10, delete "antenna, elements" and insert -- antenna elements --, therefor.

Signed and Sealed this
Twentieth Day of March, 2012

David J. Kappos
*Director of the United States Patent and Trademark Office*